United States Patent [19]

Lambregts

[11] Patent Number: 5,050,086
[45] Date of Patent: Sep. 17, 1991

[54] AIRCRAFT LATERAL-DIRECTIONAL CONTROL SYSTEM

[75] Inventor: Antonius A. Lambregts, Issaquah, Wash.

[73] Assignee: The Boeing Company, Seattle, Wash.

[21] Appl. No.: 516,755

[22] Filed: Apr. 30, 1990

[51] Int. Cl.$^5$ .......................... G05D 1/02; B64C 13/16
[52] U.S. Cl. .................................... 364/434; 364/447; 364/429; 244/179
[58] Field of Search ............... 364/433, 434, 447, 448, 364/428; 318/585, 586; 244/76 C, 90 R, 184, 76 R, 179, 186, 195, 194, 75 R

[56] References Cited

U.S. PATENT DOCUMENTS

| | | | |
|---|---|---|---|
| 3,777,242 | 12/1973 | Tribuno et al. | 318/586 |
| 3,815,850 | 6/1974 | Tribuno et al. | 364/434 |
| 4,006,870 | 2/1977 | Boone et al. | 244/184 |
| 4,046,341 | 9/1977 | Quinlivan | 364/434 |
| 4,094,479 | 6/1978 | Kennedy, Jr. | 318/586 |
| 4,167,735 | 9/1979 | Lewis | 364/447 |
| 4,354,240 | 10/1982 | Olive | 364/434 |
| 4,533,999 | 8/1985 | Lambregts | 244/183 |
| 4,536,843 | 8/1985 | Lambregts | 364/434 |
| 4,626,998 | 12/1986 | Adams et al. | 364/434 |
| 4,964,599 | 10/1990 | Farineau | 364/434 |

*Primary Examiner*—Parshotam S. Lall
*Assistant Examiner*—Michael Zanelli
*Attorney, Agent, or Firm*—Joan H. Pauly

[57] ABSTRACT

An aircraft's horizontal flight path and sideslip angle is controlled in a system having a roll control loop and a yaw control loop. An incremental aileron position command signal is generated in the roll control loop as a function of the sum of a yaw rate error and a sideslip error. An incremental rudder position command signal is generated in the yaw control loop as the function of the difference between these errors. The yaw rate error is determined as a function of a heading error. The manner in which the heading error is computed varies with the control mode in which the system is operating. In the simplest heading mode, the heading error is the difference between a heading command a sensed heading of the aircraft. In the inner loop of the roll control channel, a roll attitude command signal is generated as a function of heading error plus sideslip error. In the inner loop of the yaw control channel, a yaw rate command signal is generated as a function of heading error minus sideslip error. These inner loop command signals are combined with roll angle and yaw rate feedback, respectively, to produce a roll attitude error signal and a yaw rate error signal. The system also provides ground track angle and lateral navigation command modes.

27 Claims, 6 Drawing Sheets

AIRCRAFT LATERAL-DIRECTIONAL CONTROL SYSTEM

GOVERNMENT RIGHTS

The Government has rights in this invention.

TECHNICAL FIELD

This invention relates to systems for automatically controlling an aircraft's horizontal flight path and sideslip angle and, more particularly, to such a system in which the sum of the yaw rate error and the sideslip rate error is controlled in a roll control loop and the difference between the yaw rate error and the sideslip rate error is controlled in a yaw control loop.

BACKGROUND INFORMATION

Historically, automatic lateral-directional systems for controlling an aircraft's horizontal flight path and sideslip angle have been developed in a piecemeal fashion, with additional functional capabilities being added one at a time. One of the early developments was a control mode in which a commanded roll attitude of the aircraft is automatically attained and held. Following the development of this type of control mode, successive control modes were added to automatically select and hold the aircraft's heading, control the aircraft by means of a localizer (a guidance signal from an airport), and finally to control the aircraft in a lateral navigation mode. The last mentioned control mode is referred to as "waypoint steering" and determines the aircraft's flight path on the basis of a series of flight legs, each of which is defined by two points on the ground. In the development of automatic lateral-directional control systems for aircraft, yaw damping and turn coordination capabilities were largely developed separately from the control modes discussed above.

The piecemeal development of lateral-directional automatic control systems has led to a number of disadvantages and problems in the known state of the art. Known control systems are overly complex in terms of both hardware and software. Because the different control modes and functional capabilities have been developed separately, rather than as part of an integrated system, known lateral-directional control systems tend to provide inconsistent performance and to have inconsistent stability characteristics between various control modes and various flight conditions. In addition, known systems fail to provide certain desirable capabilities. These include active sideslip control (i.e. active control of motion of the aircraft in a lateral direction relative to the longitudinal axis of the aircraft); automatic roll/yaw trim (i.e. automatic positioning of control surfaces to maintain the aircraft's horizontal flight path, for conditions such as engine failure); automatic flat turn capability; and automatic forward sideslip decrab for crosswind landing.

What is meant by "decrab" is the last minute lining up of the longitudinal axis of the aircraft with the runway just before touchdown. This is necessary because of the conventional technique of crabbing the aircraft in a crosswind, i.e. orienting the nose of the aircraft into the crosswind to give it an apparent sideways motion with respect to the ground and compensate for the crosswind. When an aircraft must land in a relatively high crosswind, landing in a crabbed orientation places severe stresses on the landing gear. In addition, landing in a crabbed orientation can result in the aircraft rolling off the runway. Therefore, it is desirable to realign the aircraft with the runway prior to touchdown.

An undesirable consequence of the inconsistent performance and stability characteristics of known lateral-directional automatic pilot control systems is that known systems are not well-suited for use on autonomous pilotless vehicles. Such vehicles must function properly under all flight conditions without pilot supervision or assistance. It is desirable to maintain proper functioning even under severely adverse conditions, such as engine failure.

The history of the development of lateral-directional control systems has also resulted in each control mode tending to have its own peculiar design and performance characteristics. The inconsistency in design and performance characteristics from mode to mode makes it difficult to integrate the control modes into a system. Moreover, problems in system integration are difficult to detect and have often only been detected at a late stage in the development program of a system. When the problems arise very late in a program in the flight test phase, the risk of damage to test aircraft and danger to test pilots is added to the disadvantages of high cost and loss of time caused by delays in discovering faults in the system.

Because known lateral-directional control systems lack a consistent overall design philosophy, adding a new function to such a system or adapting it to a new aircraft is very costly and time consuming. Extensive basic engineering and system integration efforts are required. In addition, each function must be separately flight tested, and the process of certifying the system for a particular aircraft is complex. All this results in a very high cost for engineering development and maintenance of known systems.

As discussed above, to the best of the applicant's knowledge, there are no known lateral-directional automatic control systems for aircraft that are fully integrated and that provide a consistent design philosophy for all control modes and flight conditions. U.S. Pat. No. 4,536,843, granted Aug. 20, 1985, to the present applicant, discloses an integrated system for controlling speed and vertical flight path of an aircraft. In the patented system, cross-over inputs from flight path to the thrust control and from speed to the elevator control are employed to obtain simultaneous speed and flight path control based on kinetic and potential energy principles. The system generates a total energy rate error signal and an energy rate distribution error signal, each of which has a flight path component and a speed component. The aircraft thrust control is operated to control the total energy state and reduce the total energy rate error to zero. The elevator control is simultaneously operated to control the distribution of energy between potential energy (altitude) and kinetic energy (airspeed) and reduce the energy rate distribution error to zero. The system provides integrated speed and vertical flight path control and helps eliminate undesired throttle activity to enhance fuel efficiency. As disclosed in the patent, the system reduces speed and flight path errors to zero at the same rate and specifically avoids coupling flight path control and speed control. In other words, adjustments to correct speed errors do not create errors in flight path and vice versa.

DISCLOSURE OF THE INVENTION

The subject of the invention is a fully integrated lateral-directional automatic control system for aircraft. The system has method and apparatus aspects. The method is a method of controlling an aircraft's horizontal flight path and sideslip angle. The apparatus is apparatus for carrying out the method. According to a basic method aspect of the invention, the method comprises providing a roll control loop and a yaw control loop. During flight, a yaw rate error and sideslip rate error are determined. In the roll control loop, an incremental aileron position command signal is generated as a function of the sum of the yaw rate error and the sideslip rate error. In the yaw control loop, an incremental rudder position command signal is generated as a function of the difference between the yaw rate error and the sideslip rate error.

A feature of the invention is determining a heading error and determining the yaw rate error as a function of the heading error. The manner in which the heading error is determined varies according to the control mode in which the system is operating. In the basic heading mode, the heading error is determined as a function of a heading command and a sensed heading of the aircraft. As used herein, a "sensed heading" means a heading that is computed in an inertial navigation system, a heading reference system, or the like, from data received from a sensor or sensors.

The method of the invention also contemplates operating in a ground track mode. In this control mode, the heading error is preferably determined by first determining a drift angle and then determining the heading error as a function of the drift angle and a ground track angle command. This preferred manner of determining the heading error provides a reliable and accurate means for maintaining the aircraft on a horizontal flight path determined by an angular orientation of the aircraft relative to the ground. Normally, this angular orientation is predetermined and provides the ground track angle command. The drift angle represents the angular change in heading required to compensate for wind.

The method of the invention also may comprise operating in a lateral navigation mode. In this type of mode, the control is based on waypoint steering, which is described above. In its basic form, operating in the lateral navigation mode according to the invention includes receiving from a navigation system a crosstrack deviation signal and a desired ground track angle signal. As used herein, "navigation system" means an onboard navigation system, an airport located system that provides a localizer guidance signal, or any other system that provides the required ground track information. The basic operation in the lateral navigation mode also includes determining a drift angle, and determining the heading error as a function of the drift angle, and the crosstrack deviation signal and desired ground track angle signal received from the navigation system.

The method of the invention preferably has the capability of operating in more than one lateral navigation mode. In the preferred embodiment of a relatively simple navigation mode, signals are received from a navigation system and a drift angle is determined, as described above. A ground track angle command is generated as a function of the desired ground track angle signal and the crosstrack deviation signal. The heading error is then determined as a function of the drift angle and the ground track angle command.

Another, more complex, preferred embodiment of operating in a lateral navigation mode comprises receiving from a navigation system the signals described above and an actual ground track angle signal. The determination of the heading error includes generating a variable gain factor as a function of the desired ground track angle signal and the actual ground track angle signal. The heading error is determined as a function of the variable gain factor and the crosstrack deviation signal. Operating in this type of lateral navigation mode causes the aircraft to follow a circular interception path. A major advantage of this aspect of the invention is that it provides an efficient means for correcting course deviations for initial intercept angles of up to 180 degrees.

A feature of the invention is determining a sideslip error, and determining the sideslip rate error as a function of the sideslip error. Another feature is the provision of decrab capability. A decrab signal is determined as a function of a drift angle. The decrab signal is subtracted from the heading error and added to the sideslip error, to align the aircraft with a runway.

According to another basic aspect of the method, a roll control channel and a yaw control channel are provided. During flight a heading error component and a sideslip error component are determined. A roll attitude command signal is generated in the roll control channel as a function of the sum of the two components. A yaw rate command signal is generated in the yaw control channel as a function of the difference between the components.

The major achievement of the invention is the provision of a fully integrated lateral control system that is relatively simple in design and readily adaptable to various types of aircraft. The system of the invention makes it possible to integrate into a single system all of the traditional functions of lateral-directional automatic pilot systems and yaw damper systems, as well as additional functions which have not been previously available in known systems. These new functions include automatic lateral (roll) and directional (yaw) trim to maintain the aircraft's horizontal course in "engine out" and other failure conditions, automatic decrab capability, and flat turn capability. The integration of traditional control functions as well as these new functions into a single system provides consistent aircraft control performance and stability for all flight conditions.

The design of the system of the invention makes it possible to have inner control loops which are specific to a particular aircraft and which are capable of selectively receiving input from a plurality of outer control loops, which correspond to various flight control modes. In the invention, the control restraints that are peculiar to a particular aircraft may be provided for in the inner control loops. This substantially eliminates any need for outer loop design work to adapt the system to a particular aircraft. The integration of the system also makes it possible to provide effective stability augmentation in the inner loops. The generation of an incremental aileron position command signal and an incremental rudder position command signal in the inner loops as the sum and difference, respectively, of the yaw rate error and the sideslip rate error effectively maintains control of the aircraft's horizontal flight path and sideslip angle and, at the same time, maintains the stability of the aircraft.

The design of the system of the invention, with its specific inner control loops that are common to all modes of operation, greatly reduces hardware and software requirements for the lateral control of an aircraft and helps to keep requirements for sensors at a minimum. A single set of inner control loops serves all flight control modes and is functional under all flight conditions. This eliminates the need that has been experienced in previous systems for having a plurality of sets of inner control loops, each of which serves different outer loop flight control modes. The inner loop design also makes the system more readily adaptable to new types of aircraft, as discussed above, and greatly facilitates the incorporation into an existing system of additional functions and/or flight control modes. The inner loop control also results in consistent performance in all control modes and flight conditions. This makes the system suitable for use on pilotless aircraft.

BRIEF DESCRIPTION OF THE DRAWINGS

In the drawings, like element designations refer to like parts throughout, and.

BEST MODE FOR CARRYING OUT THE INVENTION

Figure 1:
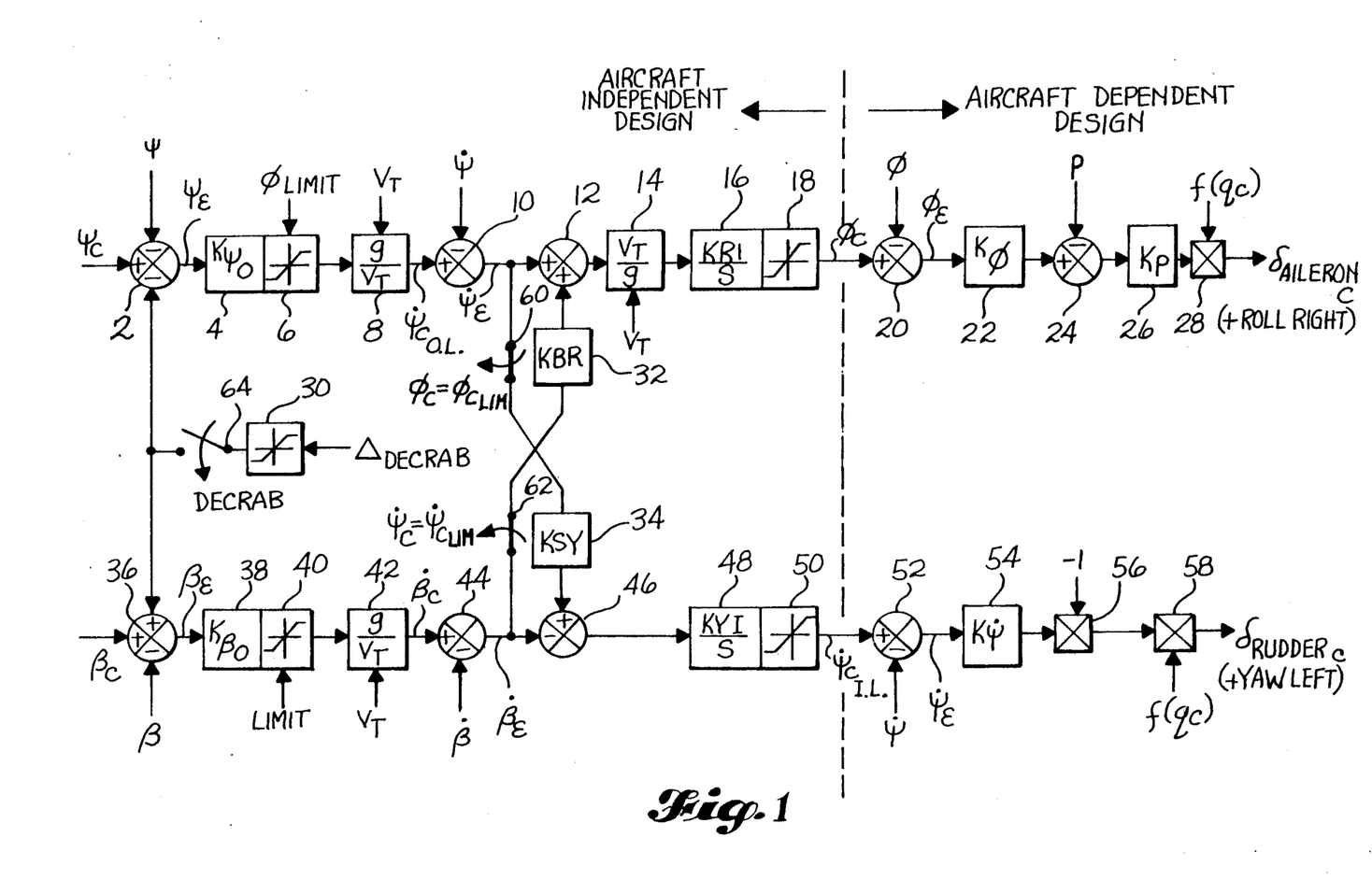
FIG. 1 is a schematic diagram of the portions of the preferred embodiment of the system that are common to all the flight control modes and of the portions of the system which provide the input into these common portions in the heading control mode.

The drawings illustrate the best mode for carrying out the method and apparatus of the invention currently known to the applicant. In FIGS. 1, 4, 6, and 7, four different flight control modes are illustrated. The illustrated modes are the currently preferred flight control modes for the system of the invention. It is anticipated that the modes illustrated will provide a complete lateral flight control system for any conventional aircraft. However, it is of course intended to be understood that other flight control modes may also be provided in addition to or in place of the illustrated modes without departing from the spirit and scope of the invention. In FIG. 1, typical aircraft dependent inner control loops are illustrated. It is intended to be understood that the illustrated inner loops may be modified to meet the constraints associated with a particular aircraft without departing from the spirit and scope of the invention.

In FIGS. 1, 4, 6, and 7, each of the elements of the system is illustrated schematically, with most of the elements being in block form. In the preferred embodiment, each element is a software element. However, the elements could also take the form of analog devices or a mixture of software and analog devices.

Referring to FIG. 1, the system of the invention includes a roll control channel, shown in the upper portion of FIG. 1, and a yaw control channel, shown in the lower portion of FIG. 1. The roll control channel includes an inner roll control loop. The yaw control channel includes an inner yaw control loop. Both channels also include an outer control loop portion. The channels have a plurality of gain factors. The outer loop gains are selected based on kinematic requirements and the desired translational control response time constants for maneuvering in the horizontal plane. The inner loop gains are designed to provide adequate control tightness and stability for the specific aircraft.

During flight, a yaw rate error $\dot{\psi}_E$ is determined in the outer loop portion of the roll control channel as a function of a heading error $\psi_E$. At the same time, a sideslip rate error $\dot{\beta}_E$ is determined in the outer loop portion of the yaw control channel as a function of a sideslip error $\beta_E$. In the inner roll control loop, an incremental aileron position command signal $\delta aileron_c$ is generated as a function of the sum of the yaw rate error $\dot{\psi}_E$ and sideslip rate error $\dot{\beta}_E$, which constitute, respectively, a heading error component and a sideslip error component. In the inner yaw control loop, an incremental rudder position command signal $\delta rudder_c$ is generated as a function of the difference between the yaw rate error $\dot{\psi}_E$ and the sideslip rate error $\dot{\beta}_E$. This is accomplished by providing crossfeed of the yaw rate error $\dot{\psi}_E$ from the roll control channel to the inner yaw control loop and crossfeed of the sideslip rate error $\dot{\beta}_E$ from the yaw control channel to the inner roll control loop.

In the yaw control channel, the sideslip error $\beta_E$ is determined from a sideslip command $\beta_c$ and a sensed actual sideslip angle $\beta$. Normally, the sideslip command $\beta_c$ will equal zero. An exception to this normal situation is when a flat turn is to be executed. In such a case, the sideslip command $\beta_c$ has a non-zero value.

The manner in which the heading error $\psi_E$ is generated in the roll control channel depends on the flight control mode in which the system is operating. In FIG. 1, the heading control mode is illustrated. This is the simplest of the flight control modes. The heading error $\psi_E$ in this mode is determined simply as the difference between a commanded heading $\psi_c$ and a sensed heading $\psi$. The heading command $\psi_c$ may be produced by the pilot using a mode control panel of a known type. Alternatively, the signal may be provided by a flight management function. Other command inputs into the system, discussed below, that are not predetermined may also be provided in either of these two manners.

The commanded heading $\psi_c$ and sensed heading $\psi$ fed into a summer 2 which subtracts the sensed heading $\psi$ from the commanded heading $\psi_c$ to produce the heading error $\psi_E$. The resulting error signal is fed into a multiplier 4. Multiplier 4 and all the elements of the roll control channel to the right of multiplier 4 (as shown in FIG. 1) are common to all of the flight control modes in the system. The source of the error signal into multiplier 4 varies according to which flight control mode the system is operating in. An appropriate switch or switches (not shown in FIG. 1) are provided to feed the appropriate signal into multiplier 4.

Whatever its source, the heading error signal $\psi_E$ is fed into the multiplier 4 which multiplies the signal by a constant gain factor $K_{\psi o}$. The gain factored signal is then passed through a limiter 6 which leaves the signal unchanged if it is less than or equal to a predetermined bank angle limit and which converts the signal to this limit if it exceeds the limit. The output of limiter 6 is fed into a multiplier 8 which multiplies the signal by the acceleration of gravity divided by the actual airspeed $g/V_T$. This converts the signal into an outer loop yaw rate command $\dot{\psi}_{cO.L.}$. This command signal is fed into a summer 10 which subtracts therefrom an actual yaw rate feedback signal $\dot{\psi}$. The output of summer 10 is the yaw rate error signal $\dot{\psi}_E$. To avoid adverse coupling between the roll dynamics and heading response, the gain $(gK_{\psi o}/V_T)$ must be limited to a value at least three to four times lower than the roll command response gain KRI, discussed below.

As noted above the yaw rate error signal $\dot{\psi}_E$ from the outer loop portion of the roll control channel is fed into both the inner roll control loop and the inner yaw control loop. In the former, the yaw rate error signal is added, in summer 12, to the sideslip rate error signal that is crossfed from the yaw control channel. The sideslip rate error signal received by summer 12 is multiplied in block 32 by a constant gain factor KBR. This factor is generally equal to one but may be given a value other than one. The crossfeed signal is also, in effect, given a value of zero by a limit switch 62 in situations when the inner loop yaw rate command signal, described below, has reached the limit value determined by limiter 50. In such a case, the aileron must revert to controlling heading only because, by itself, it can control only one variable.

The output of summer 12 is fed into a multiplier 14 which multiplies the signal by $V_T/g$. This multiplication factor is provided in the roll control channel, but there is not an equivalent multiplication factor in the yaw control channel. This is necessary in order to provide proper turn coordination. A steady coordinated turn requires a yaw rate proportional to the bank angle and inversely proportional to speed. This relationship is expressed by the equation $$\dot{\psi}_c = g\phi_c/V_T$$

where $\dot{\psi}_c$ is the inner loop yaw rate command in the inner yaw control loop and $\phi_c$ is the roll attitude command in the inner roll control loop. Both of these commands are described further below.

Still referring to the roll control channel as shown in FIG. 1, the output from multiplier 14 is fed into an integrator/multiplier 16. In this block element 16, the signal is integrated and multiplied by a constant gain factor KRI. The constant KRI determines the yaw rate or roll command build-up time constant $\tau_{\phi c} = \tau_{\dot\psi} = 1/KRI$ for a step outer loop yaw rate command $\dot{\psi}_{CO.L.}$. It also, in effect, controls the maximum roll rate. The integrated gain factored signal from block 16 is fed into a limiter 18. The limiter 18 functions in the same manner as the limiter 6 to implement maneuver limits. In the case of limiter 18, the upper limit of the signal may be somewhat higher than in the case of limiter 6 since the signal being limited has the additional input of the sideslip rate error crossfed from the yaw control channel. This would allow for sideslip control and off nominal roll trim.

The output of limiter 18 forms the roll attitude command signal $\phi_c$ referred to above. This signal is fed into a summer 20 which subtracts therefrom bank angle (roll attitude) feedback $\phi$ to form a roll attitude error signal $\phi_E$. This error signal is, fed into multiplier 22 which multiplies it by a gain factor $K_\phi$. The signal from block 22 is fed into a summer 24 in which roll rate feedback p, obtained from sensed data in a known manner, is subtracted therefrom. The output of summer 24 is fed into another multiplier 26 which multiplies it by a gain factor $K_p$. The output of block 26 is fed into a multiplier 28 which multiplies it by a function of the compressible dynamic pressure $q_c$. Block 28 serves to adapt the signal to varying velocity conditions in a well known manner. This maintains the reaction of the control system uniform for all flight conditions. The output of block 28 is an incremental aileron position command signal $\delta aileron_c$ which is fed to and processed by the aircraft's aileron position control mechanism in a known manner to produce the incremental change in the aileron position required to reduce the roll attitude error of the inner loop to zero.

Still referring to FIG. 1, the yaw control channel operates in a manner similar to the roll control channel. As noted above, in the yaw control channel, the sideslip error $\beta_E$ is determined from a sideslip $\beta_c$ command and a sensed actual sideslip angle $\beta$. This is accomplished in a summer 36 which receives the sideslip command and subtracts therefrom the actual sideslip angle. The sideslip error $\beta_E$ generated by summer 36 is fed into a multiplier 38 which multiplies, the error signal by a constant gain factor $K_{\beta o}$. Normally, $K_{\beta o}=K_{\psi o}$. The gain weighted output of multiplier 38 is fed through a limiter 40 which limits the signal to a predetermined practical value in the same manner that the limiter 6 limits the signal in the roll control channel. The output of limiter 40 is fed into a multiplier 42 which multiplies the signal by $g/V_T$ to convert it into a sideslip rate command $\dot{\beta}_c$. The resulting command signal is fed into a summer 44 which subtracts therefrom sideslip rate feedback $\dot{\beta}$. The output of summer 44 is the sideslip rate error $\dot{\beta}_E$ which is fed into the inner loop of the yaw control channel and is also crossfed into the inner loop of the roll control channel, as described above.

In the yaw control channel, the error signal from summer 44 is fed directly into summer 46 which subtracts it from a gain factored yaw rate error signal crossfed from the roll control channel. The crossfed signal is gain factored and limited in a manner similar to the gain factoring and limiting of the crossfed signal from the yaw control channel to the roll control channel discussed above. The signal moves through a limit switch 60 which cuts off the signal to, in effect, make it equal zero when the roll attitude command signal $\phi_c$ of the roll control channel has reached a predetermined limit value applied by limiter 18. This causes the rudder to revert to controlling the single variable sideslip. The signal also passes through a multiplier 34 which multiplies it by a constant gain factor KSY. Like the gain factor of block 32, this factor KSY is normally equal to unity.

The output of the summer 46 provides input for an integrator/multiplier 48. This system element 48 operates in a manner similar to the integrator/multiplier 16 in the roll control channel. It multiplies the signal by a constant gain factor KYI and integrates the signal. The gain KYI normally equals or nearly equals the gain KRI applied by block 16 to produce coordinated turn entry. The output of element 48 is fed through a limiter 50 which functions in the same manner as the limiter 18 in the roll control channel. The output of the limiter 50 is the inner loop yaw rate command $\dot{\psi}_{cIL}$.

In the inner loops, the integration of the signals in the integrators 16, 48 form the inner loop control signals $\phi_c$, $\dot{\psi}_{cIL}$. The integrators also serve to smooth the response of the control system to step command changes in the outer loop and prevent response overshoot of the outer loop commands. The use of integrated signals to prevent overshoot is known and is accomplished in the system of the invention in a simple and efficient manner.

The inner loop yaw rate command signal from the limiter 50 is input into a summer 52 which subtracts therefrom yaw rate feedback $\dot{\psi}$ produce a yaw rate error signal $\dot{\psi}_E$. The yaw rate feedback $\dot{\psi}$, in conjunction with the yaw rate command signal $\dot{\psi}_c$, provides effective yaw damping. The traditional washout on the yaw rate feedback is not needed because of the integral control on the outer loop provided by integrator 48. This control will drive $\beta_E$ to zero, regardless of how much rudder trim is required. The required trim is normally zero, but can be considerable in case of an engine out or a lateral imbalance. The yaw rate error signal is input into a multiplier 54 which multiplies it by a gain factor $K_{\dot{\psi}}$. The gain weighted error signal from multiplier 54 is fed into control block 56 which inverts the sign of the signal, i.e. multiplies it by $-1$. The sign inverted signal is then fed into a multiplier 58 which, like multiplier 28 in the roll control loop, multiplies the signal by a function of the compressible dynamic pressure to maintain uniform reaction of the system for all flight conditions. The adjusted signal from block 58 is an incremental rudder position command signal $\delta$rudder$_c$ that is received by the aircraft's rudder control mechanism which adjusts the rudder position in response to the signal in a known manner.

DECRAB AND FLAT TURN

The system shown in FIG. 1, as described above, provides all the necessary elements for coordinated heading and sideslip control of an aircraft during flight. The system of the also has additional specialized functions. One of these functions is decrab which, as described above, is a maneuver to line the aircraft up with the runway in a crosswind just prior to touchdown. In the decrab maneuver, the system provides simultaneous sideslip and yaw (heading) commands, with $\psi_c = -\beta_c$. Referring to FIG. 1, the input of these commands is accomplished by closing a decrab switch 64. The closing of the switch 64 allows the decrab signal $\Delta_{DECRAB}$ to be input into the summers 2, 36 in the roll and yaw control channels. In the roll control channel summer 2, the decrab signal is subtracted from the other signals making up the heading error. In the yaw control channel summer 36, the decrab signal is added to the other signals making up the sideslip error. This simultaneous input of command signals with equal magnitudes but opposite senses in the two channels results in a heading change through the yaw control channel with simultaneous roll retrim through the roll control channel to cancel the side force due to sideslip and thereby avoid side drift.

The commanded decrab angle is developed as a function of the aircraft's actual drift angle $\delta$, which represents the difference between the runway heading and the aircraft heading. For example, the actual sensed drift angle may be smoothed out over a brief period to produce the command angle. The commanded decrab angle may have to be limited because the resulting forward slip condition causes a trim bank angle which may need to be limited. The limiting of the bank angle may be necessary, for example, to limit side loads on the landing gear and/or to prevent the aircraft from landing in an impermissible orientation, such as an orientation in which the aircraft geometry causes a portion of the aircraft other than the landing gear to contact the runway. In order to provide the necessary limiting of the trim bank angle, a limiter 30 is preferably provided, as shown in FIG. 1, to limit the decrab command signal. As noted above, the gain factor KBR applied in block 32 is generally equal to one. The value of this gain factor may need to be adjusted for a particular aircraft to yield exact drift-free decrab since the steady state ratio of bank angle to sideslip angle $\phi/\beta$ is a function of aircraft geometry.

Another special function of the system of the invention is the execution of a flat turn. In a flat turn, the bank angle $\phi$ is equal to zero. This requires simultaneous inputs of matched sideslip and outer loop yaw rate commands. As noted above, this is one of the special cases when the sideslip command $\beta_c$ is not equal to zero. The side force resulting from the sideslip with a roll angle equal to zero puts the aircraft in a flat turn. The achievable turn rate is generally small and depends on the configuration and vertical tail size of the particular aircraft.

TRACK ANGLE MODE

Figure 2:
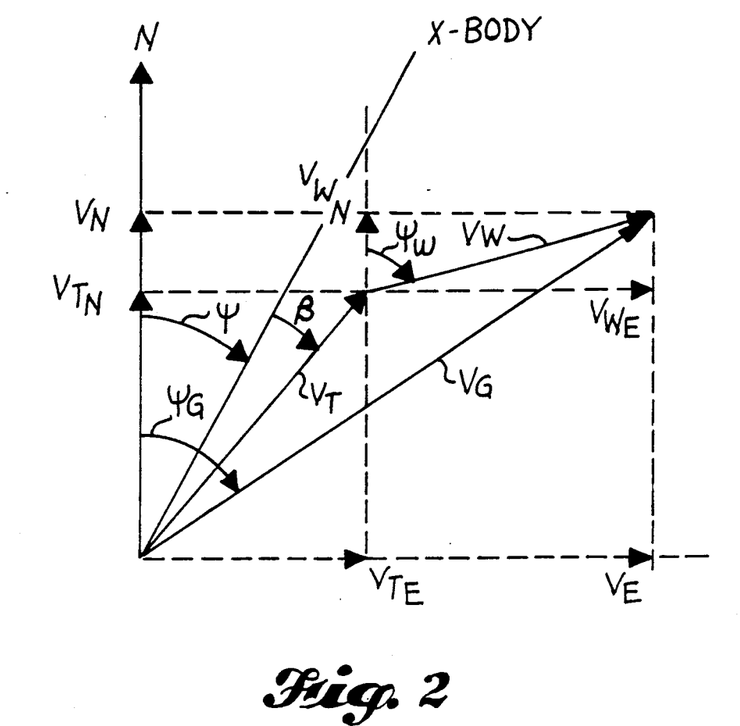
FIG. 2 is a vector diagram illustrating wind computation for the ground track control mode.
Figure 3:
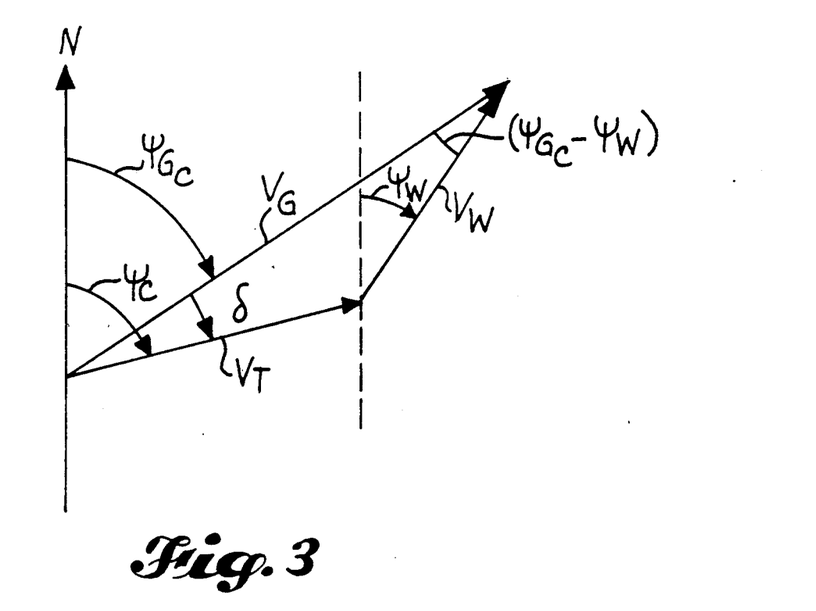
FIG. 3 is a vector diagram illustrating the heading command computation for the ground track control mode.
Figure 4:
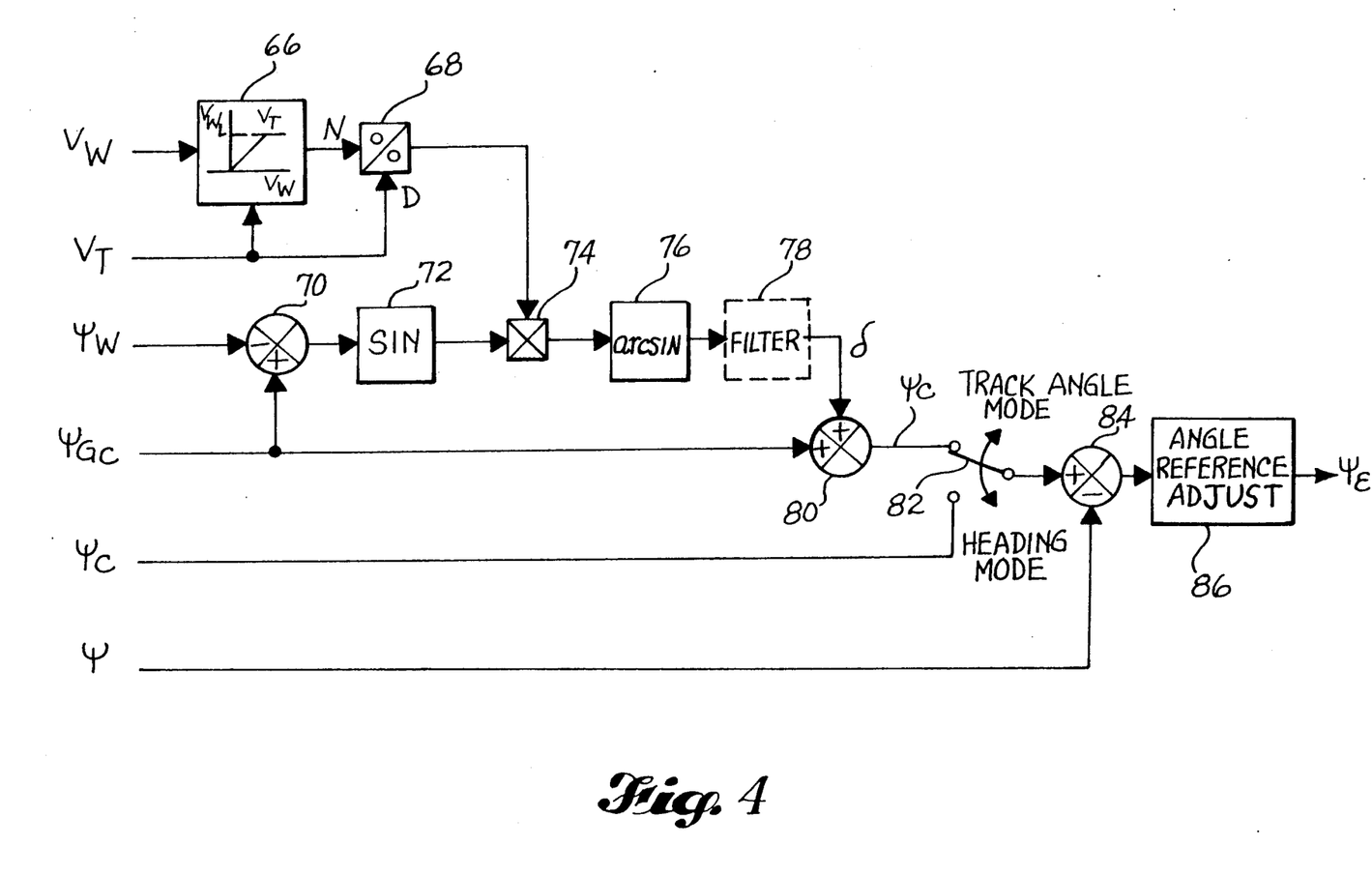
FIG. 4 is a schematic diagram of the preferred embodiment of the outer loop portion for the ground track mode.

As discussed above, the system of the invention preferably has a plurality of modes of operation. Each of these modes has its own unique set of signal processing elements to generate the heading error signal $\psi_E$. The track angle mode is illustrated in FIGS. 2–4. In FIG. 4, a switch 82 is shown for switching between the heading mode shown in FIG. 1 and the track angle mode. The track angle mode is similar to the heading mode except that it is defined in the inertial reference frame, i.e. with reference to the ground. In the track angle mode, the aircraft is steered to follow an angular orientation relative to the ground. Only the angular orientation of the aircraft is controlled. There is no attempt in this mode to cause the aircraft to fly over a particular pathway on the ground.

For most applications in which wind speed is a small fraction of the aircraft's true airspeed, track angle error can be substituted directly for heading error to produce a track angle mode. However, since ground speed equals the sum of true airspeed and wind speed, track angle changes are affected by wind and aircraft speed and direction. When the head wind component approaches the true airspeed of the aircraft, the ground speed becomes small, and side wind variations or small turn corrections will result in large ground track angle changes. Therefore, the approach of substituting track angle error directly for heading error results in a control system for which stability is a function of the wind. This is acceptable only for relatively low wind conditions.

In the system of the invention, the commanded track angle $\psi_{Gc}$ is converted into a commanded heading angle $\psi_c$ to avoid the problems of direct feedback substitution and still make use of the generic elements of the system shown in FIG. 1. FIGS. 2 and 3 illustrate the derivation of the control commands to convert the track angle command into a heading command, and then a heading error $\psi_E$, to provide input for the system elements shown in FIG. 1. The inputs into the track angle mode are aircraft heading $\psi$, true airspeed $V_T$, wind speed $V_W$, and wind direction $\psi_W$. Airspeed and heading are obtained from the air data and heading reference system of the aircraft. Ground speed $V_G$ and actual track angle $\psi_W$ are obtained from the inertial reference unit. Referring to FIG. 2, the wind speed $V_W$ and direction $\psi_W$ be computed from the true airspeed and its north and east components $V_N$, $V_E$, as follows:

$$V_{WN} = V_N - V_T \cos(\psi + \beta)$$

$$V_{WE} = V_E - V_T \sin(\psi + \beta)$$

$$V_W = \sqrt{V_{WN}^2 + V_{WE}^2}$$

$$\psi_W = \arctan(V_{WE}/V_{WN})$$

For most applications, the sideslip correction is negligibly small. Referring to FIG. 3, the required heading command $\psi_c$ equals the target ground track angle $\psi_{Gc}$ plus the drift angle $\delta$, and is computed as follows:

$$\bar{V}_G = \bar{V}_T + \bar{V}_W$$

Using the sine rule:

$$V_W/\sin \delta = V_T/\sin(\psi_{Gc} - \psi_W)$$

Therefore:

$$\delta = \arcsin((V_W/V_T)\sin(\psi_{Gc} - \psi_W))$$

$$\psi_c = \psi_{Gc} + \delta$$

These equations are implemented as shown in FIG. 4 to provide the basic track angle control mode. The wind speed $V_W$ and aircraft airspeed $V_T$ are input into a limiter 66. The purpose of this block element 66 is to ensure that the arcsine is defined in every case. When the system is being operated to control a slow aircraft, in extreme cases the ratio of wind speed to airspeed could exceed one and the arcsine would not be defined in that case. Therefore, the wind amplitude is limited in limiter 66 to the value of the true airspeed. This results in the aircraft heading straight into the wind if the wind component across the desired track exceeds the airspeed. The output of limiter 66 is fed into divider block 68 which divides it by the true airspeed. The output of block 68 is fed into multiplier 74.

The other input into multiplier 74 is derived from the wind direction $\psi_W$ desired ground track angle $\psi_{Gc}$ input. The values of these two factors are fed into summer 70 which subtracts the wind direction from the desired ground track angle. The output of summer 70 is fed into block element 72 which operates to calculate the sine of its input. The output of block 72 is fed into multiplier 74. The output of block 74 is then fed into block 76 which derives a drift angle by taking the arcsine of the input.

The drift angle computation is likely to be noisy, especially in turbulence. To reduce the effect of the noise on the control activity, the drift angle is preferably filtered to maintain control smoothness. Therefore, the preferred embodiment shown in FIG. 4 has a filter 78 which receives the signal from block 76. The filter 78 is, for example, a low pass filter which filters the drift angle signal in a known manner.

The calculated drift angle $\delta$ and desired ground track angle $\psi_{Gc}$ are added together in summer 80 to produce the heading command signal $\psi_c$. This command signal is fed into 84, in which the heading feedback $\psi$ is subtracted from the command signal to produce an error signal. This error signal is then fed through an angle reference adjustment 86 to produce the final heading error signal $\psi_E$. The angle reference adjustment 86 is necessary to ensure that the aircraft will turn to correct its course over the smallest angle, i.e. maintains the heading error signal within the range of $-180$ degrees to $+180$ degrees. When the input into angle reference adjustment 86 is greater than 180 degrees, the error is adjusted by $-360$ degrees. When the incoming signal is less than $-180$ degrees, it is corrected by $+360$ degrees. In all other cases, the output of block 86 equals its input.

LATERAL NAVIGATION MODE

Figure 6:
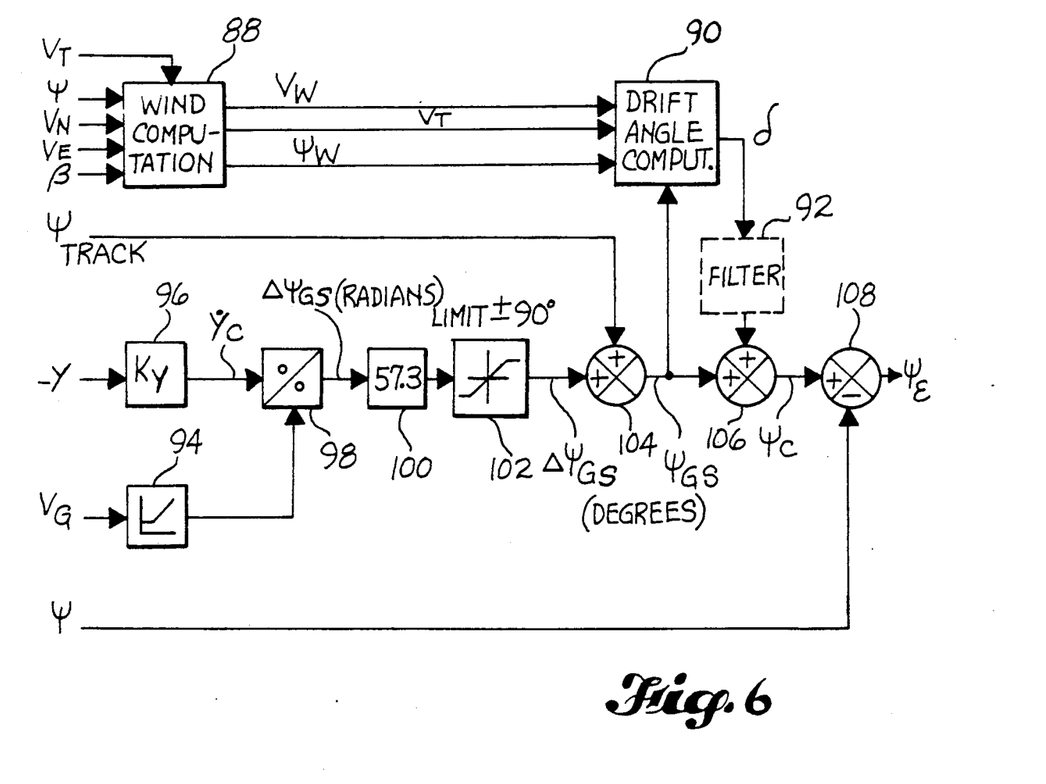
FIG. 6 is a schematic diagram of the outer loop portions for a first preferred embodiment of the lateral navigation control mode.
Figure 7:
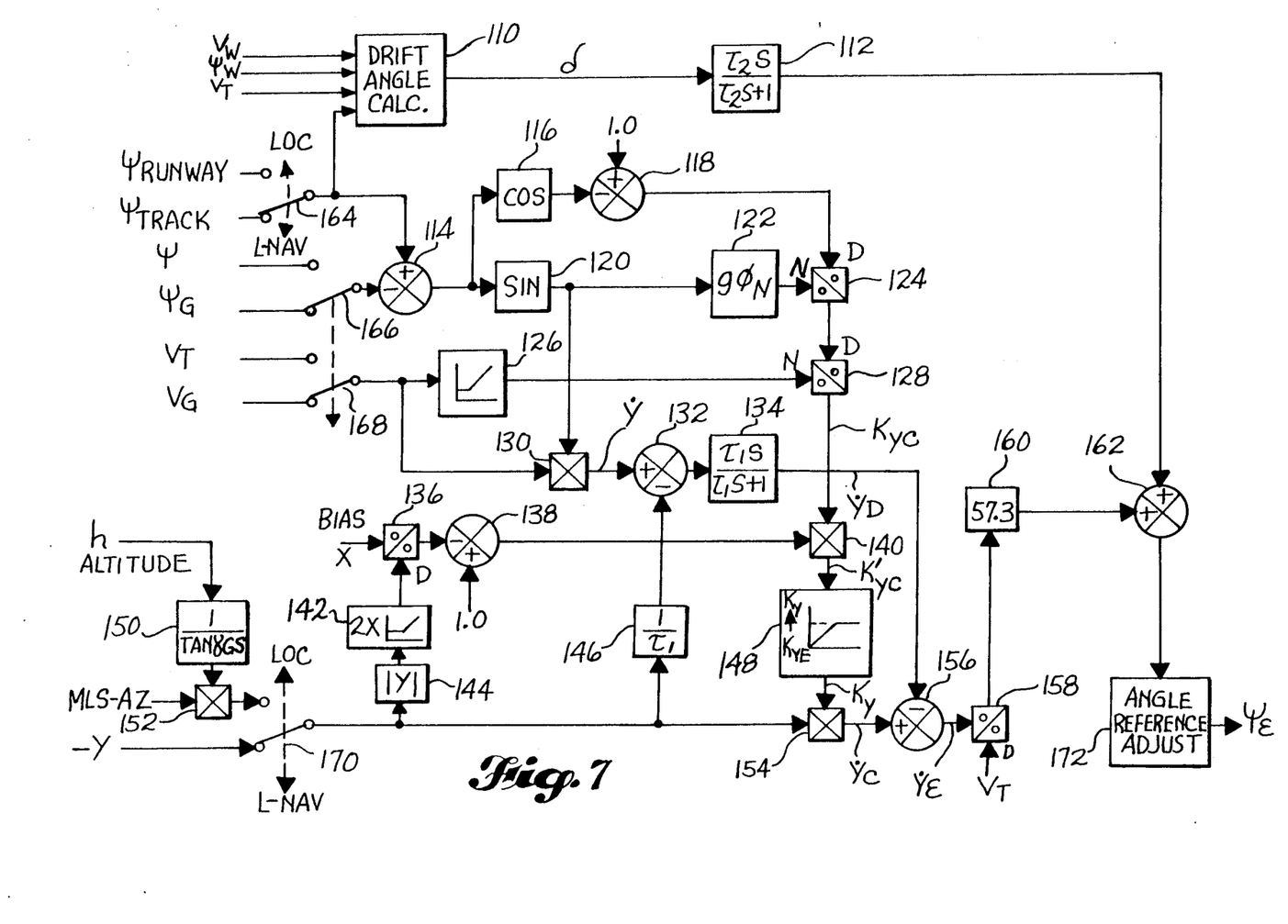
FIG. 7 is a schematic diagram of the outer loop portions for a second preferred embodiment of the lateral navigation control mode.

A lateral navigation mode provides the capability to guide the aircraft along a specific inertially referenced flight path over the ground determined by straight line segments ("legs") between waypoints. Waypoints are locations on the earth determined by latitude and longitude. To operate in a lateral navigation mode, the aircraft needs an inertial navigation system to store the waypoints of the aircraft's desired flight path over the ground and calculate the present position of the aircraft in latitude and longitude, as well as its position relative to the current leg and the next leg to be flown. FIGS. 6 and 7 illustrate the preferred embodiments of lateral navigation modes in the system of the invention. FIG. 6 shows a relatively simple lateral navigation mode, and FIG. 7 shows a more complex mode.

Figure 5:
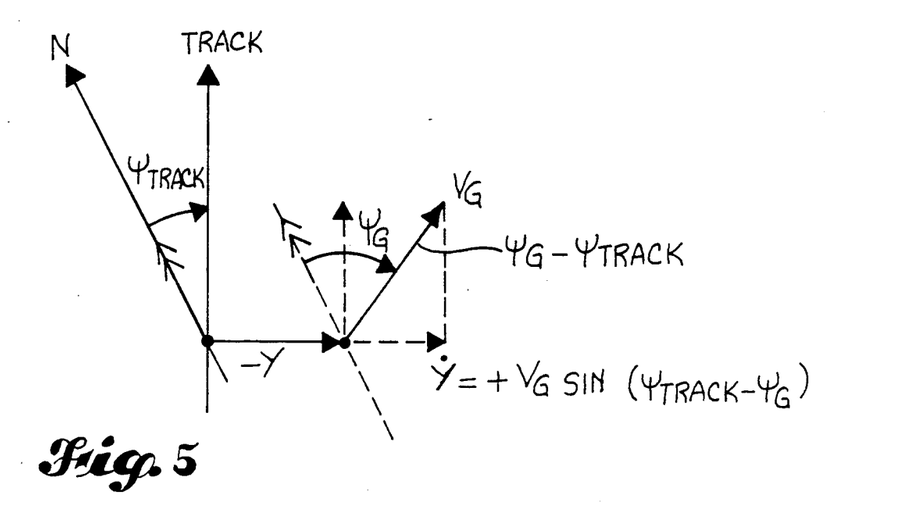
FIG. 5 is a vector diagram illustrating the computation of the crosstrack velocity for the lateral navigation mode.

The derivation of the lateral navigation mode control elements shown in FIG. 6 is illustrated in FIG. 5. The computations convert the problem of lateral control along a waypoint pattern to a problem of track angle control. This makes it possible to use the track angle mode computation of the drift angle, shown in FIG. 4, and add it to a computed steering angle to convert the input to a heading command $\psi_c$ which may be utilized by the generic system elements shown in FIG. 1.

Referring to FIG. 6, the predetermined desired ground track angle $\psi_{TRACK}$ for the current navigation leg and the crosstrack deviation y with respect to this track are provided by the navigation system. The crosstrack deviation y is the perpendicular distance between the aircraft's location and the current navigation leg. These signals are input into the lateral navigation mode subsystem illustrated in FIG. 6. The crosstrack deviation signal $-y$ is fed into a multiplier 96 which multiplies the signal by a gain factor $K_y$. This generates a proportional crosstrack velocity command $\dot{y}_c$. If the control system is able to establish and maintain this commanded crosstrack velocity, the crosstrack deviation will decay exponentially with a time constant $\tau_y = 1/K_y$. The gain factor $K_y$ is selected to be compatible with the heading mode gain. This requires a crosstrack deviation time constant at least three to five times longer than the heading mode time constant.

Referring to FIG. 5, $$\dot{y} = V_G \sin(\psi_G - \psi_{TRACK})$$

$\dot{y}/V_G \approx (\psi_G - \psi_{TRACK})$ for small $(\psi_G - \psi_{TRACK})$ Therefore, the commanded crosstrack velocity $\dot{y}_c$ can be normalized into an incremental track angle command $\Delta\psi_{GS}$. This is accomplished in divider 98 which divides the command signal by the aircraft ground speed $V_G$. The ground speed signal received by divider 98 comes from a limiter 94 which limits the signal to a value greater than zero to avoid dividing by zero. The output of divider 98 is in radians. It is converted into degrees in block 100. The output of block 100 is fed into a limiter 102 which limits the signal so that its absolute value is less than or equal to 90 degrees. The limited incremental track angle command signal from block 102 $\Delta\psi_{GS}$ is fed into summer 104 where it is added to the ground track angle command signal $\psi_{TRACK}$. The output of summer 104 is the commanded steering angle $\psi_{GS}$. The steering angle command is fed into summer 106 where it is added to the drift angle signal $\delta$.

The computation of the drift angle signal is illustrated in the upper portion of FIG. 6. Initially, the wind speed $V_W$ and direction $\psi_W$ are computed in block 88 from the true airspeed $V_T$ of the aircraft, the aircraft heading $\psi$, the north and east components of the airspeed $V_N$, $V_E$, and the sideslip angle $\beta$. The wind speed and direction are fed into system elements 90 that compute the drift angle. These elements 90 preferably are the elements shown in FIG. 4 which function to compute the drift angle. A filter 92 is shown separately in FIG. 6.

As noted above, the drift angle signal is added to the steering angle command signal in summer 106. The output of summer 106 is the heading command $\psi_c$. This heading command is fed into summer 108, which may be summer 2 shown in FIG. 1. Summer 108 subtracts the heading feedback signal (from the air data and heading reference system of the aircraft) from the heading command signal to produce the heading error signal $\psi_E$ which serves as input into the generic portions of the system shown in FIG. 1.

ADVANCED LATERAL NAVIGATION MODE

As shown in FIG. 6, the lateral navigation mode tracking accuracy is affected by the accuracy of the drift angle computation and the sensing and computing of the airspeed, inertial velocities, heading, and sideslip. Long term bias errors will produce a proportional crosstrack deviation error. For some applications, it may be desirable for the tracking performance to be unaffected by ground speed, heading, or sideslip bias errors. It may also be desirable for large leg intercept angles (i.e. angles with an absolute value greater than 90 degrees) to be executed with the greater part of the turn having a constant turning radius. Therefore, the control system of the invention is preferably also provided with the second preferred embodiment of a lateral navigation mode, as shown in FIG. 7. In contrast to the control mode of FIG. 6, in which the cross track deviation y is normalized into an incremental track angle command $\Delta\psi_{GS}$ using ground speed $V_G$, the control mode of FIG. 7 first develops a crosstrack velocity error $\dot{y}_E$ which is subsequently normalized into an angular steering error by dividing through by the aircraft's airspeed $V_T$ in divider 158.

Figure 8:
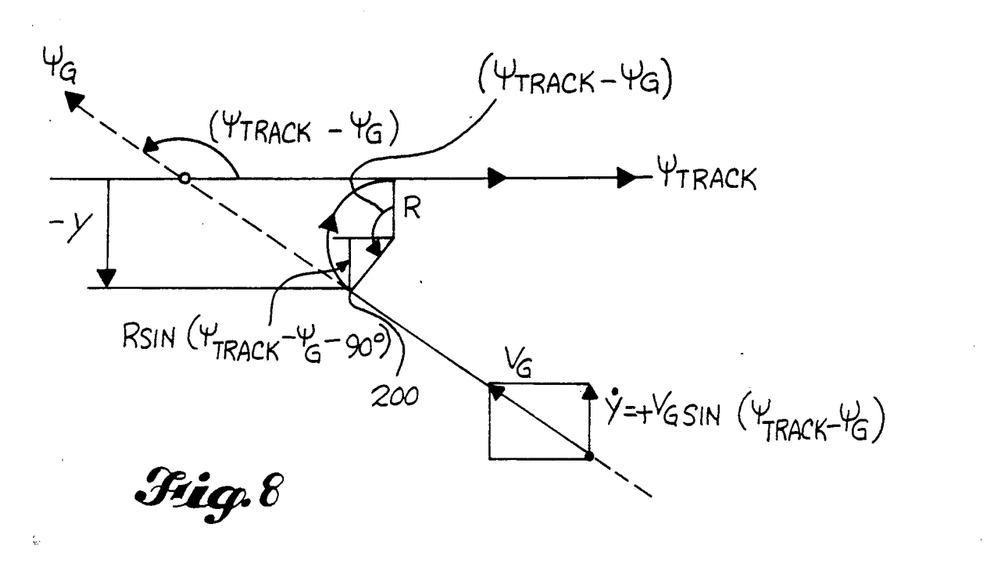
FIGS. 8 and 9 are diagrams illustrating the circular interception path of the aircraft when the system is operating in the lateral navigation mode illustrated in FIG. 7.

The generating of the crosstrack velocity error signal $\dot{y}_E$ requires an explicit crosstrack velocity signal $\dot{y}$ which is obtained from the equation $\dot{y}=V_G \sin(\psi_{TRACK}-\psi_G)$, as illustrated in FIG. 8. Referring to FIG. 7, the computation represented by this equation is carried out by the control elements of the lateral navigation mode illustrated in FIG. 7. The desired ground track angle signal $\psi_{TRACK}$ and the actual ground track angle signal $\psi_G$ are received from the navigation system by summer 114 which subtracts the latter from the former. The sine of the output of summer 114 is computed in block 120. The output of block 120 is fed into multiplier 130 which also receives the actual ground speed signal $V_G$. The two inputs are multiplied to obtain the crosstrack velocity signal $\dot{y}$.

To be sure that errors in the computed crosstrack velocity signal do not affect the steady state tracking accuracy of the control mode, the signal from multiplier 130 is washed out and complimented by a lagged rate of change of crosstrack deviation y. The complementary lagged signal is generated in block 146 which multiplies the crosstrack deviation input $-y$ into the system by a time lag factor $1/\tau_1$. The output of block 146 is fed into summer 132 which subtracts it from the output of multiplier 130. The output of summer 132 is fed into block 134, which is a washout filter (high pass) of a known type.

The output of block 134 is a derived crosstrack velocity feedback signal $\dot{y}_D$, which is accurate for any intercept angle. This computation of the derived signal has the advantage of eliminating the possibility of excessively high loop gain for low ground speeds because the true airspeed of the aircraft is bounded, whereas the ground speed can theoretically be equal to zero.

Figure 9:
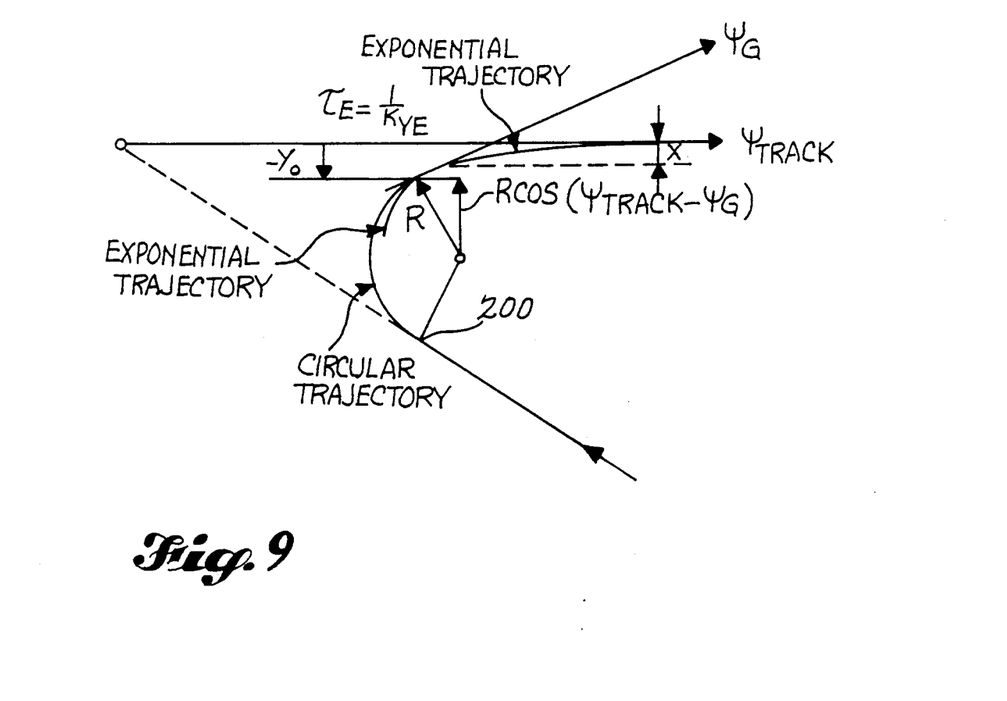

The constant turning radius intercept feature of the mode illustrated in FIG. 7 is developed as illustrated in FIGS. 8 and 9. Referring to FIG. 8, the crosstrack distance for a circular intercept trajectory with a radius R is:

$$-y = R + R\sin(\psi_{TRACK} - \psi_G - 90°)$$
$$= R(1 - \cos(\psi_{TRACK} - \psi_G))$$
$$= (V_G^2/g\phi)(1 - \cos(\psi_{TRACK} - \psi_G))$$

The control mode of FIG. 7 computes a crosstrack velocity command signal and requires a, crosstrack velocity feedback signal. This feedback signal $\dot{y}$ is obtained from the equation illustrated in FIG. 8.

Since the control law of FIG. 6 provides the relationship $-y(K_y)=\dot{y}_c$, a variable gain factor $K_{yc}$ that is a function of the aircraft's location on the circular intercept path can be derived as follows:

$\dot{y} = V_G \sin(\psi_{TRACK} - \psi_G)$

Therefore: $V_G = \dot{y}/(\sin(\psi_{TRACK} - \psi_G))$ $-y = (V_G^2/g\phi)(1-\cos(\psi_{TRACK}-\psi_G))$, as shown above Therefore:
$-y = (V_G\dot{y}/g\phi)(1-\cos(\psi_{TRACK}-\psi_G))/\sin(\psi_{TRACK}-\psi_G)$ $\ddot{y}_C = (-yg\phi/V_G)(\sin(\psi_{TRACK}-\psi_G))/(1-\cos(\psi_{TRACK}-\psi_G))$ $K_{yc} = (g\phi/V_G)(\sin(\psi_{TRACK}-\psi_G))/(1-\cos(\psi_{TRACK}-\psi_G))$ In the computation of the variable gain factor $K_{yc}$, the value of a nominally desired bank angle may be used.

The aircraft will execute the nominal bank angle $\phi_N$, assuming there is no wind. The actual bank angle will depend on the ground speed $V_G$. It should be noted that the computation of $K_{yc}$ and $K_{YE}$ are for the desired nominal trajectories, which will require the computed nominal bank angles only for an ideal no wind situation. Under wind conditions, the control system will attempt to fly the same trajectory by adjusting the bank angle and heading.

The schematic diagram of FIG. 7 illustrates the execution of the above equations to determine the variable gain factor $K_{yc}$. The output of summer 114 is fed into two control element blocks 116, 120, which calculate the cosine and sine, respectively, thereof. The cosine value from block 116 is received in summer 118 which reverses its sign and adds 1.0 to it. The sine output of block 120 serves as input into multiplier 122 which multiplies it by the acceleration of gravity g times the nominally desired bank angle. The output of block 122 is divided by the output of summer 118 in divider 124. Then the ground speed signal $V_G$, which is limited in limiter 126 to have a value greater than zero, is divided in block 128 by the signal from 124 to produce at its output the signal $K_{yc}$. Limiter 126 works in a manner similar to the limiter 94 in FIG. 6. The output is equal to the input, except for very small values of input, for which the output is constant.

Referring to FIG. 7, separate computations are made to determine the point at which the course of the aircraft should be altered to intercept the next leg of the inertially referenced flight path, using the variables for the next track leg. Assuming that the waypoints are sufficiently far apart, the cross track deviation y relative to the next track leg will be initially large, and will thereby dominate the calculated steering error (heading error) $\psi_E$. As long as the steering error signal has the same sign as the crosstrack deviation input $-y$, the aircraft has not yet reached the point at which a course correction should be made, and control switchover is inhibited. As the aircraft moves closer to the track leg, the absolute value of the crosstrack deviation input signal $-y$ declines to a point where the derived crosstrack velocity feedback signal $\dot{y}_D$ begins to dominate and change the sign of the steering error signal. The sign change in the steering error signal indicates the point 200 (FIGS. 8 and 9) where the aircraft velocity vector is tangent to the capture trajectory. This is the point where the course correction should be initiated to steer the aircraft into a flight path designed to capture the track leg course. Once the transition point 200 has been reached and determined, the input into the control system, as shown in FIG. 7, is initialized with the variables for the next track leg to cause a heading error signal $\psi_E$ to develop that will drive the bank angle adjustment necessary to smoothly execute the capture maneuver.

As shown in FIG. 8, the computed value of the variable gain factor $K_{yc}$ is for a circular intercept path that is tangent to the desired final track leg. This trajectory has only the tangent point itself in common with an exponential capture trajectory that would result from using a constant gain factor $K_y$ equal to a preselected constant value $K_{YE}$. Therefore, to allow a smooth transition from the circular trajectory to the exponential trajectory, the circular trajectory shown in FIG. 8 must be offset from the final track leg by a certain distance X, as shown in FIG. 9. This can be accomplished by adjusting the variable gain factor, preferably as shown in FIG. 7.

Referring to FIG. 7, the actual crosstrack deviation signal $-y$ is input into block 144 which computes the absolute value thereof. The output of block 144 is fed into limiter 142 which limits the signal to a minimum value of 2X, where X is a predetermined constant derived as described below. The output of block 142 is equal to the input except for input values of 2X or less, for which the output is equal to a constant value of 2X. Divider 136 receives a signal representing X and divides it by the output of limiter 142. The result is fed into summer 138 which reverses its sign and adds 1.0 to it. The output of summer 138 is fed into multiplier 140. The other input into multiplier 140 is the signal $K_{yc}$ at the output of block 128.

The output of multiplier 140 is an initial value of the variable gain factor $K'_{yc}$ which constitutes the variable gain factor necessary to fly a circular intercept trajectory that is offset from the desired track by a distance X. The signal $K'_{yc}$ is input into limiter 148. The output of limiter 148 is the same as the input for input values equal to or less than the exponential capture trajectory gain constant $K_{YE}$. For higher input values, the output of limiter 148 is equal to the constant exponential gain factor $K_{YE}$. The limiter 148 is necessary because the value of the variable constant $K_{yc}$ output from divider 128 to force a circular intercept trajectory increases as the intercept distance decreases Therefore, the output of multiplier 140 must be smaller than the exponential gain factor at the start of the circular trajectory to allow transition to the exponential trajectory by simply letting the variable gain factor rise in value as the turn progresses until it reaches the value of the constant exponential gain factor At the transition point between the circular trajectory and the exponential trajectory, smooth transition requires that the boundary conditions, i.e. the values of the angle represented by the difference between the desired ground track angle and the actual ground track angle ($\psi_{TRACK} - \psi_G$), the banking angle $\phi$, and the crosstrack deviation constant $K_y$, be the same for both trajectories. Therefore, the circular intercept path must be placed at the correct distance X from the desired ground track. This distance can be found by first computing the roll angle $\phi$ as a function of crosstrack distance y required to follow the exponential trajectory, where:

$$y = y_0 e^{-t/\tau} \qquad (\tau = 1/K_{YE})$$

$$\dot{y} = \frac{-y_0}{\tau} e^{-t/\tau} = \frac{-y}{\tau}$$

$$\ddot{y} = \frac{y_0}{\tau^2} e^{-t/\tau} = \frac{y}{\tau^2}$$

Also $\dot{y} = V_G \sin(\psi_{TRACK} - \psi_G)$ $\ddot{y} = V_G \cos(\psi_{TRACK} - \psi_G) \dot{\psi}$    ($V_G$ = constant)

and since $\dot{\psi} = \frac{g \phi}{V_T}$ therefore $\ddot{y} = \frac{g V_G \phi}{V_T} \cos(\psi_{TRACK} - \psi_G) = \frac{y}{\tau^2}$ or $\phi = \frac{y V_T}{g \tau^2 V_G} \cdot \frac{1}{\cos(\psi_{TRACK} - \psi_G)}$ -continued Substituting $\frac{y}{\tau} = -\dot{y} = V_G \sin(\psi_{TRACK} - \psi_G)$ Yields $\phi = \frac{V_T}{g\tau} \text{TAN}(\psi_{TRACK} - \psi_G)$ Or $(\psi_{TRACK} - \psi_G) = \text{TAN}^{-1} \frac{g\phi\tau}{V_T}$ The offset X required to match exactly the boundary condition parameters at the transition point varies little for varying speed, when a fixed roll angle equal to a nominally desired value is used. Therefore, in practice, a constant value of X somewhat larger than the theoretical value to account for bank angle response lags may be used. The use of a constant value of X provides a relatively simple computation in the control mode represented by FIG. 7 that results in a high performance lateral navigation control mode.

Returning to FIG. 7, the gain factored output from limiter 148 is input into multiplier 154 which also receives the actual crosstract deviation signal −y. The output of multiplier 154 is a crosstrack velocity command signal $\dot{y}_c$. This command signal is input into summer 156 which subtracts therefrom the crosstrack velocity feedback signal $\dot{y}_D$. The output of summer 156 is a crosstrack velocity error signal $\dot{y}_E$, which is input into divider 158 which divides it by the true airspeed to normalize it into an angular steering error. The output of divider 158 is converted in block 160 from radians to degrees by multiplying it by 57.3. The converted output of block 160 is added, in summer 162, to a washed out drift angle signal. The drift angle signal is computed in block 110 in the same manner as in FIGS. 4 and 6. The computed signal is then washed out in washout filter 112. The results of the computations in summer 162 is input into angle reference adjustment block 172, which functions in the same manner as block 86 in FIG. 4. The output of block 172 is the heading error signal $\psi_E$ which is processed by the generic elements of the system shown in FIG. 1.

LOCALIZER CONTROL MODE

The system of FIG. 7, as described above, is a lateral navigation control mode in which the lateral navigation system of the aircraft provides the input. A variation of this mode is a localizer control mode, also illustrated in FIG. 7. This mode is essentially the same as the previously-described lateral navigation mode of FIG. 7, except for the crosstrack deviation input −y and the desired track input. The desired track input is switched from a predetermined ground track $\psi_{TRACK}$ from the aircraft navigation system to a track $\psi_{RUNWAY}$. The switchover of the ground track signal is accomplished by switch 164. The switchover of the crosstrack deviation input is accomplished by switch 170. In the localizer mode, the crosstrack deviation is derived from an instrument landing system or microwave landing system azimuth guidance error and a signal representative of the aircraft's distance to the airport transmitter or altitude above the terrain. The latter case is illustrated in FIG. 7.

The control function illustrated in FIG. 7 assumes that the aircraft is approaching on a predetermined glide slope angle $\gamma_{GS}$. The altitude h is input into multiplier 150 which multiplies it by 1 divided by the tangent of the glide slope angle. The result is multiplied in multiplier 152 by a signal MLS-AZ representative of the microwave landing system azimuth guidance error to produce the crosstrack deviation signal.

The preferred configuration of the control system for the localizer control mode is illustrated in FIG. 7 (with the exception of the positions of switches 164, 170). The preferred configuration uses ground speed $V_G$, runway heading $\psi_{RUNWAY}$ and ground track angle $\psi_G$ to compute the crosstrack velocity signal for input into the washout filter 134. For cases in which an inertial reference system is not available, an approximate crosstrack velocity signal is computed using true airspeed $V_T$ instead of ground speed $V_G$ and heading angle $\psi$ of ground track angle $\psi_G$. Input switches 166, 168 are provided to accomplish this change in input. The approximate computation results in some capture performance degradation under high crosswind conditions. However, the use of the variable gain factor permits successful executions of captures from initial approach angles of up to nearly 180 degrees, assuming that the airport provides wide angle microwave landing system azimuth guidance coverage.

FEEDBACK SIGNAL SYNTHESIS

The performance of the system in terms of flight path tracking control activity in turbulence and wind shear and in cases of static and dynamic sensor errors depends to a large extent on the preprocessing of the sensor information used in the feedback signals of the system. System bias errors in the inner loop feedbacks are fully compensated by use of the "proportional+integral" control structure of the portions of the control channels shown in FIG. 1 which generate the inner loop control signals, i.e. the roll attitude command signal $\phi_c$ and the yaw rate command signal $\psi_{cI.L.}$ in the roll control channel and the yaw control channel, respectively. In other words, the processing which results in these command signals applies proportional gain factors to the input and also integrates the input. In addition, inner loop feedback signal errors that are low frequency in nature are attenuated by the operation of the outer loops.

For the outer loops, processing of the feedback signals for the yaw rate $\dot{\psi}$, sideslip $\beta$, and sideslip rate $\dot{\beta}$ is desirable. Referring to FIG. 1, the yaw rate feedback signal into summer 10 may be obtained from a body mounted yaw rate gyro (providing r) with satisfactory results. However, theoretically a better signal would be a pure yaw rate, defined as the rate of rotation around a geometrically vertical axis. Furthermore, for the path tracking modes, better performance is achieved when a derived yaw rate is used. This derived rate is made up from $\dot{y}_D/V_T$ for the low frequency range and r for the high frequency range, as follows:

$$\hat{\dot{\psi}}_D = \left(\frac{1}{\tau}\frac{\dot{y}_D}{V_T} + r\right)\frac{\tau s}{\tau s + 1}$$

The sideslip related feedbacks are derived from a combination of sensed aerodynamic sideslip $\beta$ and inertial sideslip rate $\dot{\beta}_I$ obtained from a yaw rate sensor (r), a lateral accelerometer $(a_y)$, and roll attitude $\phi$ based on the following known side force equation:

$$\dot{v} = \frac{\Sigma F_A}{m} - ur + wp + g\cos\theta\sin\phi$$

Since $a_y=(\Sigma F_A)/m$, neglecting products of small quantities, $\cos\phi$ is approximately equal to 1, $\sin\phi$ is approximately equal to $\phi$, and u approximately equals $V_T$. Thus, $$\dot{\beta}_I = \frac{\dot{v}}{V_T} \approx -r + \frac{a_y + g\phi}{V_T}$$

The aerodynamic sideslip can be sensed by a vane or by differential pressure ports on a hemispherical probe. The sensed sideslip $\beta$ is first corrected in a known manner for location and installation effects to yield a corrected sideslip $\beta_{COR}$. The corrected sideslip is combined with an inertial sideslip rate $\dot{\beta}_I$ in a second order complementary filter to produce the derived sideslip and sideslip rate values $\hat{\beta}, \hat{\dot{\beta}}$ that are used as feedback $(\beta, \dot{\beta})$ in the control system of the invention. The input signals are received by summers 36, 44, as shown in FIG. 1. The operation of the complementary filter is expressed by the following equations:

$$\hat{\beta} = \frac{S\dot{\beta}_I + K_2 S \beta_{cor} + K_1 \beta_{cor}}{S^2 + K_2 S + K_1}$$

$$\hat{\dot{\beta}} = \frac{S^2 \dot{\beta}_I + K_2 S \dot{\beta}_I + K_1 S \beta_{cor}}{S^2 + K_2 S + K_1}$$

The filter constants $K_1$ and $K_2$ are optimized in a known manner to give a blend of inertial and airmass referenced data for best system performance in turbulence and wind shear.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A method of controlling an aircraft's horizontal flight path and sideslip angle, said aircraft having at least one aileron and a rudder, said method comprising:
   providing a roll control loop, and a yaw control loop, during flight, determining a yaw rate error and a sideslip rate error;
   generating, in said roll control loop, an incremental aileron position command signal as a function of the sum of said yaw rate error and said sideslip rate error; and generating, in said yaw control loop, an incremental rudder position command signal as a function of the difference between said yaw rate error and said sideslip rate error; and
   in response to said signals, producing incremental changes in the aileron's position and the rudder's position to control the aircraft's horizontal flight path and sideslip angle.

2. The method of claim 1, which comprises determining a heading error, and in which said yaw rate error is determined as a function of said heading error.

3. The method according to claim 2, comprising operating in a heading mode, including determining said heading error as a function of a heading command and a sensed heading of the aircraft.

4. The method of claim 2, comprising operating in a ground track mode, including determining a drift angle, and determining said heading error as a function of said drift angle and a ground track angle command.

5. The method of claim 2, comprising operating in a lateral navigation mode, including receiving from a navigation system a crosstrack deviation signal and a desired ground track angle signal, determining a drift angle, generating a ground track angle command as a function of said desired ground track angle signal and said crosstrack deviation signal, and determining said heading error as a function of said drift angle and said ground track angle command.

6. The method of claim 2, comprising operating in a lateral navigation mode, including receiving from a navigation system a crosstrack deviation signal and a desired ground track angle signal, determining a drift angle, and determining said heading error as a function of said drift angle, said crosstrack deviation signal, and said desired ground track angle signal.

7. The method of claim 6, which comprises receiving from a navigation system an actual ground track angle signal; and in which the step of determining said heading error comprises generating a variable gain factor as a function of said desired ground track angle signal and said actual ground track angle signal, and determining said heading error as a function of said variable gain factor and said crosstrack deviation signal, to cause the aircraft to follow a circular interception path.

8. The method of claim 7, which comprises generating a crosstrack velocity command signal; in which the step of generating said variable gain factor comprises generating a derived crosstrack velocity signal as a function of said desired ground track angle signal, said crosstrack deviation signal, and said actual ground track angle signal; and the step of determining said heading error comprises determining said heading error as a function of the difference between said heading error as a function of the difference between said crosstrack velocity command signal and said derived crosstrack velocity signal divided by the true airspeed of the aircraft, and of said drift angle.

9. The method of claim 6, in which the step of determining said heading error comprises generating a heading command signal equal to the sum of said desired ground track angle signal, said drift angle, and an incremental track angle that is proportional to said crosstrack deviation signal.

10. The method of claim 2, which comprises determining a sideslip error, and in which said sideslip rate error is determined as a function of said sideslip error.

11. The method of claim 10, in which said yaw rate error is determined as a function of a yaw rate command and yaw rate feedback, said sideslip rate error is determined as a function of a sideslip rate command and sideslip rate feedback, and the steps of generating said incremental command signals comprise integrating said yaw rate error and said sideslip rate error.

12. The method of claim 10, comprising determining a drift angle; determining a decrab angle as a function of said drift angle; and subtracting said decrab angle from said heading error, and adding said decrab angle to said sideslip error, to align the aircraft with a runway just prior to touch down of the aircraft on the runway.

13. The method of claim 2, in which the step of determining said yaw rate error comprises generating a yaw rate command signal as a function of said heading error multiplied by a gain factor and the acceleration of gravity constant and divided by the true airspeed of the aircraft.

14. The method of claim 1, which comprises determining a sideslip error, and in which said sideslip rate error is determined as a function of said sideslip error.

15. The method of claim 14, in which the step of generating said incremental rudder position command signal comprises integrating said sideslip rate error.

16. The method of claim 14, in which the step of determining said sideslip rate error comprises generating a sideslip rate command signal as a function of said sideslip error multiplied by a gain factor and the acceleration of gravity constant and divided by the true airspeed of the aircraft.

17. The method of claim 16, which comprises determining a heading error, and in which the step of determining said yaw rate error comprises generating a yaw rate command signal as a function of said heading error multiplied by a gain factor and the acceleration of gravity constant and divided by the true airspeed of the aircraft.

18. The method of claim 1, in which the step of generating said incremental rudder position command signal comprises generating a yaw rate command signal, and the step of generating said incremental aileron position command signal comprises generating a roll attitude command signal equal to said yaw rate command signal multiplied by the true airspeed of the aircraft divided by the acceleration of gravity constant, to kinematically coordinate said yaw rate command signal and said roll attitude command signal.

19. A method of controlling an aircraft's horizontal flight path and sideslip angle, said aircraft having a plurality of control surfaces, said method comprising:
providing a roll control channel and a yaw control channel;
during flight determining a heading error component and a sideslip error component;
generating, in said roll control channel, a roll attitude command signal as a function of the sum of said heading error component and said sideslip error component; and generating, in said yaw control channel, a yaw rate command signal as a function of the difference between said heading error component and said sideslip error component; and
processing said signals to produce incremental changes in the control surfaces' positions to control the aircraft's horizontal flight path and sideslip angle.

20. The method according to claim 19, comprising operating in a heading mode, including determining said heading error component as a function of a heading command and a sensed heading of the aircraft.

21. The method of claim 19, comprising operating in a ground track mode, including determining a drift angle, and determining said heading error component as a function of said drift angle and a ground track angle command.

22. The method of claim 19, comprising operating in a lateral navigation mode, including receiving from a navigation system a crosstrack deviation signal and a desired ground track angle signal, determining a drift angle, generating a ground track angle command as a function of said desired ground track angle signal and said crosstrack deviation signal, and determining said heading error component as a function of said drift angle and said ground track angle command.

23. The method of claim 19, comprising operating in a lateral navigation mode, including receiving from a navigation system a crosstrack deviation signal and a desired ground track angle signal, determining a drift angle, and determining said heading error component as a function of said drift angle, said crosstrack deviation signal, and said desired ground track angle signal.

24. The method of claim 23, which comprises receiving from a navigation system an actual ground track angle signal; and in which the step of determining said heading error component comprises generating a variable gain factor as a function of said desired ground track angle signal and said actual ground track angle signal, and determining said heading error component as a function of said variable gain factor and said crosstrack deviation signal, to cause the aircraft to follow a circular interception path.

25. The method of claim 19, in which said roll attitude command signal is equal to said yaw rate command signal multiplied by the true airspeed of the aircraft divided by the acceleration of gravity constant, to kinematically coordinate said yaw rate command signal and said roll attitude command signal.

26. A system for controlling an aircraft's horizontal flight path and sideslip angle, said aircraft having at least one aileron and a rudder, said system comprising:
a roll control channel;
a yaw control channel;
means for determining a heading error component and a sideslip error component; and
means for generating, in said roll control channel, an incremental aileron position command signal as a function of the sum of said heading error component and said sideslip error component, and for generating, in said yaw control channel, an incremental rudder position command signal as a function of the difference between said heading error component and said sideslip error component, to produce incremental changes in the aileron's position and the rudder's position to control the aircraft's horizontal flight path and sideslip angle.

27. The system of claim 26, comprising a plurality of outer loops, each of which corresponds to a different control mode; and means for selectively receiving input into said roll control channel from each of said outer loops.

* * * * *

UNITED STATES PATENT AND TRADEMARK OFFICE
CERTIFICATE OF CORRECTION

PATENT NO. : 5,050,086
DATED : September 17, 1991
INVENTOR(S) : Antonius A. Lambregts It is certified that error appears in the above-identified patent and that said Letters Patent is hereby corrected as shown below:

On the Title page, item [57],
In the Abstract, 13th line down, insert -- and -- after " a heading command".

Column 6, line 59, before "fed", insert -- are --.
Column 7, line 61, " $\psi_{CO.L.}$ " should be -- $\dot{\psi}_{C_{O.L.}}$ --.
Column 8, line 7, delete the comma after "is".
Column 8, line 28, " $\beta_C$ command" should be -- command $\beta_C$ --.
Column 8, line 33, delete the comma after "multiplies".
Column 9, line 17, insert -- to -- before "produce".
Column 11, line 9, " $\psi_W$ " should be -- $\psi_G$ --.
Column 11, line 10, insert -- can -- before "be".

UNITED STATES PATENT AND TRADEMARK OFFICE
CERTIFICATE OF CORRECTION

PATENT NO. : 5,050,086
DATED : September 17, 1991
INVENTOR(S) : Antonius A. Lambregts It is certified that error appears in the above-identified patent and that said Letters Patent is hereby corrected as shown below:

Column 11, line 56, insert -- and -- before "desired".
Column 14, line 44, delete the comma after "a".
Column 14, line 56, there is a period after "above".
Column 14, line 59, "$V_g \dot{y}$" should be -- $V_G \dot{y}$ --.
Column 14, line 62, "$\dot{y}_C$" should be -- $\dot{y}_C$ --.
Column 14, line 62, "$yg\phi$" should be -- $yg\phi$ --.
Column 16, line 29, there is a period after "decreases"; and in line 35, after "factor".
Column 17, line 25, insert -- derived -- before "crosstrack".
Column 18, line 12, after "heading angle $\psi$", insert -- instead --.
Column 18, line 35, "$\dot{\psi}_{c_{I.L.}}$" should be -- $\dot{\psi}_{c_{I.L.}}$ --.
Column 19, line 2, "$\cos\phi$" should be -- $\cos\theta$ --.
Claim 1, column 19, line 42, "loop," second occurrence, should be -- loop; --.

Signed and Sealed this

Sixth Day of July, 1993

*Attest:*

MICHAEL K. KIRK

*Attesting Officer*     Acting Commissioner of Patents and Trademarks